(No Model.)

O. HASBROUCK, Jr.
BUTTER CUTTER.

No. 437,814. Patented Oct. 7, 1890.

WITNESSES:
Harry King
C. W. H. Arnold

INVENTOR:
Oscar Hasbrouck Jr.,
By Irving Uhing
Attorney

UNITED STATES PATENT OFFICE.

OSCAR HASBROUCK, JR., OF MODENA, NEW YORK.

BUTTER-CUTTER.

SPECIFICATION forming part of Letters Patent No. 437,814, dated October 7, 1890.

Application filed May 2, 1890. Serial No. 350,270. (No model.)

*To all whom it may concern:*

Be it known that I, OSCAR HASBROUCK, Jr., a citizen of the United States, residing at Modena, in the county of Ulster and State of New York, have invented certain new and useful Improvements in Butter-Cutters; and I do hereby declare the following to be a full, clear, and exact description of the invention, such as will enable others skilled in the art to which it appertains to make and use the same.

My invention relates to improvements in butter-cutters and lifters, and has for its objects simplicity, low cost, and durability in a butter-cutter, which does the work of cutting, measuring, and lifting butter or similar substances from a tub or firkin equally well with more complicated, more expensive, and less durable cutters such as have been put upon the market. I attain these objects by the device illustrated in the accompanying drawings, in which—

Figure 1:
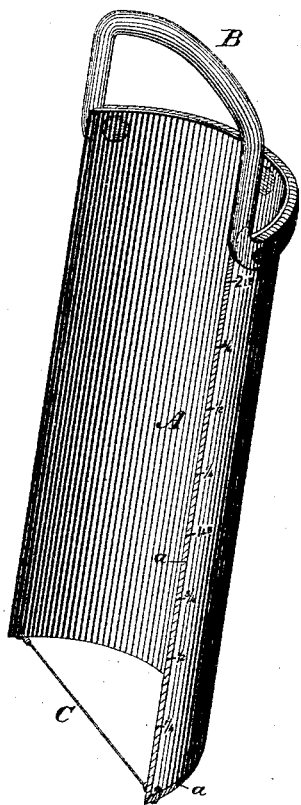
Figure 2:
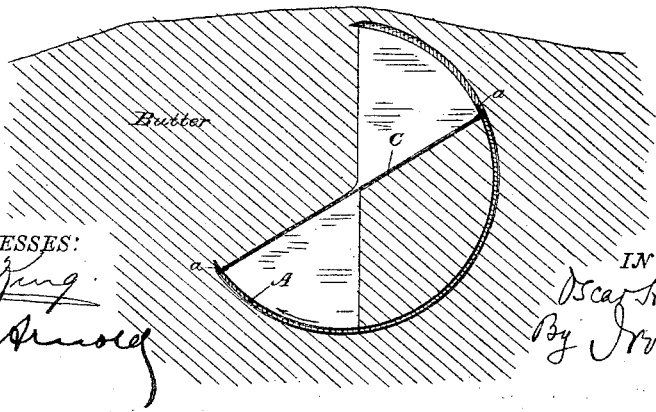

Figure 1 is a perspective view of my butter-cutter as it appears ready for use; and Fig. 2 is a horizontal section of the bottom of the cutter after insertion in the butter, the plane of the section being the same as that occupied by the cutting-wire C, the latter being shown in the act of cutting off the butter-roll at the bottom.

Similar letters refer to similar parts in both the views.

A represents a piece of sheet metal shaped into the form of a half-cylinder, or being, preferably, perhaps about one-quarter of an inch less than a complete half-circle. It may be of any desired size; but to cut a roll of two pounds of butter, as shown in the drawings, it should be about seven inches long with a three and one-half inch diameter to the circle. Probably the best material for its construction is steel one-sixteenth of an inch in thickness and provided with cutting-edges at the sides and bottom, represented by $a\ a$ in the drawings.

B represents a handle attached to the cutter and may be of any rigid material, which will enable one to press down and turn the cutter in the butter or similar material. It will be seen that this handle is formed with a horizontal portion $b$, which conforms to the contour of the semi-cylindrical body and has formed integral therewith a vertical bail $b'$, forming a hand-grasp, and preferably circular in shape. The part $b$ has its surface thickened and is riveted to the body portion. By providing this surface $b$ a re-enforcement is formed for the semi-cylindrical body at the point where the greatest strain occurs.

C represents a wire cut-off extending from one lower outer corner of the cutter A to the opposite corner across the bottom of the cutter. This wire serves to separate at the bottom the roll of butter which is to be removed after the cutter is pressed down perpendicularly and turned half around. This is shown clearly in Fig. 2. The wire C, as the cutter is pressed down, cuts the roll in the center; but as the cutter is turned half around after being inserted to the desired depth the two parts of the roll are pressed solidly together again, and upon removing the cutter it brings out with it a round roll square at each end. On the side of the cutter A, as shown in Fig. 1, may be put a scale of weights, so that any desired quantity may be accurately removed from a tub or firkin. This feature, however, is rather a matter of convenience and is not essential to my invention in its simplest form, which requires only an approximate half-cylinder provided with a handle or any means of pressing it down and turning it and a wire cut-off for separating the butter or similar material.

It will readily be seen that for practical use by grocers and dairymen my invention presents several marked advantages over the more complicated butter-cutters now in use. It is not only much less expensive and much easier to use, but it is also less likely to get out of order and much more easily kept perfectly clean.

I do not confine myself to any particular kind of material for its construction, as any material may be used if it has the requisite stiffness and can be shaped to a form approximating a half-circle. Nor is it essential to have three cutting-edges, though that is most convenient for the easy operation of the cutter. Nor do I confine myself to the cutting of butter with my device, as lard, dough, or any similar substance may be cut with it equally well.

What I claim, therefore, as my invention, and desire to secure by Letters Patent, is—

In a butter-cutter, the combination, with the curved cutting-body, of a handle, said handle having a horizontal portion secured to the cutting-body so as to form a re-enforced surface, and a vertical bail formed integral with said horizontal portion, substantially as set forth.

In testimony whereof I affix my signature in presence of two witnesses.

OSCAR HASBROUCK, JR.

Witnesses:
IRVING ETING,
HENRY W. GILBERT.